Patented Sept. 6, 1938

2,128,917

UNITED STATES PATENT OFFICE 2,128,917

TOOTH PASTE

Ernest C. Crocker, Belmont, Mass., assignor to Arthur D. Little Incorporated, Cambridge, Mass., a corporation of Massachusetts No Drawing. Application April 16, 1936, Serial No. 74,787

7 Claims. (Cl. 167—93)

This invention relates to tooth pastes. Its object is primarily to furnish a preparation of sodium bicarbonate in stable paste form, such that it may be purveyed in collapsible tubes and extruded from such tubes in the form of a coherent rod or ribbon, upon the bristle ends of a tooth brush, and be applied by the brush to the teeth without dripping or waste. In other words this phase of my object is concerned with making sodium bicarbonate available for use as a dentifrice in a clean, compact and convenient form, without possibility of scattering, (which is an objection to its use in the dry powdered condition), and without dripping and partially dissolving before application to the teeth, (which are objectionable effects of first wetting the powder or the brush). Further objects are to provide a tooth paste which is free from abrasives injurious to the enamel of the teeth, is wholly soluble in the fluids of the mouth, is free also from dehydrating glycerine, caustic soaps and all other agents which have deleterious effects on the gums or teeth, and has a pure white color appearance; and to provide as a preferred ingredient of such a tooth paste, though not an essential one, a non-soapy detergent capable of removing the film composed of mucin and fatty derivatives of food which forms and clings tenaciously on the teeth.

Sodium bicarbonate is an excellent dentifrice. It is both a cleanser and a purifier. Its particles, when divided to a suitable condition of fineness for spreading and scrubbing over the surfaces of the teeth, have sufficient mass and hardness to act with loosening effect on the mucin film, but are not hard enough to abrade or injure the enamel of the teeth. Being soluble in water and saliva, the particles which are not brushed and washed away in the course of cleaning the teeth are soon dissolved. It is of alkaline reaction and neutralizes to a greater or less extent an acid condition of the mouth.

These characteristics of sodium bicarbonate have been known and appreciated by leaders in the dental profession, but have not been available heretofore in a condition free from disagreeable or harmful features. My problem has been to avoid such objectionable features and produce a paste in which the bicarbonate crystals are undissolved and are protected against absorption of moisture from the air when exposed, which is sufficiently plastic to flow readily from a collapsible tube when squeezed and to spread freely when brushed over the teeth, and at the same time is sufficiently coherent so that it will not ooze from the opened mouth of the tube in the absence of squeezing pressure. After extensive experimentation I have solved this problem and have produced a novel tooth paste, of which the essential characteristics and the preferred composition are set forth in the following specification and claims.

The essentials of the tooth paste are sodium bicarbonate powder and a substantially saturated syrup as a vehicle to hold the grains of bicarbonate in a mass of stable pasty consistency. Preferably a relatively small quantity of a gel forming agent is included to prevent oozing of the paste. The syrup is preferably a saturated solution of cane sugar (sucrose); that is, its content of sugar is sufficient to bind substantially all of the content of water in the paste and prevent any appreciable solvent action on the bicarbonate. Refined cane sugar is used rather than any other sugar because the resultant syrup is colorless; but in its broader aspects the invention is not limited thereto. Syrup not only serves as means for binding sodium bicarbonate in a pasty condition, but it has also the very important characteristic that it is not absorptive of moisture. It does not withdraw moisture from the gums, as glycerine does, and so does not tend to dry the gums; neither does it absorb moisture from the atmosphere and become more liquid.

The gel forming ingredient is provided to prevent separation or drainage of the liquid from the solid contents of the paste, such as might cause too great concentration of liquid at the mouth of the tube and dripping therefrom when the cap is removed or left off. It creates a jelly network throughout the paste which retains the liquid in its distribution throughout the mass of paste and prevents oozing. I have found that soap in a content of the order of from ¼% to 1% of the whole composition is suitable and sufficient for this purpose. A high-grade dentifrice soap, or similar soap which is non-caustic is used. The quantity of such soap contained in the amount of paste used in any application is so minute as to have no irritating effect on the gums or destructive effect on the digestive ferments in the saliva.

I find it desirable also to supplement the mechanical cleansing action of the bicarbonate grains by means having a solvent action on the mucin deposit, but which has no injurious effect on the gums or teeth. For this purpose I use a non-soapy detergent, preferably one of the products made by sulfating the synthetic higher aliphatic alcohols, typically those of 12 to 18 carbon atoms, which result from hydrogenation of the corresponding acid. Sulfation is effected by treating with sulfuric acid. Treatment of the resulting acid alkyl sulfate with an alkali gives the products of the type referred to. In brief, such compounds are alkali salts of the higher acid alkyl sulfates, and have the general formula $R.O.SO_2.OM$, where R is an alkyl radical, and M an alkali metal. The detergent which I particularly prefer is mainly lauryl sodium sulfate, and is prepared from the alcohol corresponding to lauric acid. It has the desired detergent effect, but is not caustic and has no ill effect on the tissues and membranes of the gums and other interior parts of the mouth, neither has it any solvent or chemical action on the substance of the teeth.

Flavoring material may also be added not only for the same purpose as in most of the tooth pastes heretofore produced, (i. e., to give an agreeable taste and make the product more attractive to purchasers), but also to stimulate salivation. The advantage of this is that the increased flow of saliva caused by such stimulation more quickly dissolves remaining particles of sodium bicarbonate, helps to dispose of any traces of starch which may be present in the mouth, and helps to flush the teeth.

The following is an example showing suitable quantities of the ingredients of, and a preferred procedure in compounding, a batch of approximately 200 pounds of the paste containing all of the ingredients herein described:

(1) Provide 28 lbs. of water heated to 180° F.
(2) Add 67 lbs. (medium granulated) sugar; stir until dissolved;
(3) Add 1/10 lb. powdered dentifrice soap, preferably while the solution is hot, and stir thoroughly;
(4) Add 4 lbs. of commercial lauryl sodium sulfate; stir until dissolved;
N. B. Use a wooden paddle for stirring;
(5) Cool to 100° F.
(6) Add 2 lbs. flavoring material; stir well to emulsify;
(7) Add 98 lbs. (more or less) sodium bicarbonate (sifted through 200 mesh sieve);
(8) Stir well until smooth.

Variation in the amount of the bicarbonate content is employed to regulate the consistency of the mass; in other words, somewhat more or less than the quantities above stated may be added in order to obtain exactly the desired quality of plasticity; i. e., a consistency neither too thick to be squeezed from a tube, nor so thin as to flow by gravity action alone. The flavoring material markedly influences the content of bicarbonate required, for it thins the composition considerably, and if omitted requires omission of at least twice its weight of bicarbonate for the same consistency, or if supplied in greater quantity requires correspondingly more bicarbonate, other things being equal. In any event enough sodium bicarbonate is used to make the paste sufficiently stiff at a temperature of 70° F. to be retained in the mouth of a tube, without running out, when the tube is held mouth downward but not squeezed.

The sugar designated above as "medium granulated" is a grade of confectioners' sugar, sold in the trade under that designation.

A suitable flavoring material, and the one which I now prefer to others, is composed of ingredients in proportions as follows:

| | Parts by weight |
|---|---|
| Peppermint oil, redistilled | 50 |
| Oil star anise | 10 |
| Oil eucalyptus globulus | 7 |
| Oil spearmint | 3 |

The fact that these essences are all oils is the reason for so stirring them into the syrup as to form an emulsion before the large content of sodium bicarbonate is added.

It will be noted from the foregoing formula that the sodium bicarbonate and syrup are provided in somewhat nearly equal parts, and that the contents of lauryl sodium sulfate or its equivalent and flavoring material are a very minor fraction of the whole amount. Either or both of these minor ingredients may be omitted without greatly impairing the utility and value of the paste composed of the remaining ingredients; and their proportions may be varied, and other changes made in the composition which do not substantially alter its utility for the purpose intended.

This paste is preferably packed in collapsible tubes of the types commonly used for purveying tooth pastes.

This application is a continuation, as to all common subject matter, of the application filed by me December 30, 1933, Serial No. 704,759, for Tooth paste.

What I claim and desire to secure by Letters Patent is:

1. A tooth paste comprising sodium bicarbonate mixed with a sufficient quantity of substantially saturated sucrose syrup to give it a pasty consistency.

2. A tooth paste comprising sodium bicarbonate mixed with a sufficient quantity of substantially saturated sucrose syrup to give it a pasty consistency, and containing a relatively small proportional content of gel forming agent sufficient to prevent oozing of the paste.

3. A tooth paste comprising sodium bicarbonate and substantially saturated sucrose syrup in substantially or nearly equal parts, and containing in the order of 1/4% to 1% of soap as a gelling agent to prevent oozing of the paste.

4. A completely water-soluble tooth paste comprising powdered sodium bicarbonate and a substantially saturated sucrose syrup, in nearly equal parts, with a minor content of an alkali salt of a higher acid alkyl sulfate.

5. A tooth paste comprising powdered sodium bicarbonate and a substantially saturated sucrose syrup in nearly equal parts, a relatively small content of dissolved soap sufficient to create a gel structure substantially preventing oozing of the paste, and a minor content of an alkali salt of a sulfonated higher alcohol.

6. A tooth paste comprising between 45% and 50% of substantially saturated sucrose syrup, approximately 2% of non-soapy detergent, between 1/4% and 1% of soap to form a gel structure, and the remainder of screened sodium bicarbonate.

7. A tooth paste comprising predominantly sodium bicarbonate and sucrose syrup intimately mixed together, the syrup containing a sufficient content of sucrose to substantially prevent solvent effect of the water content on the sodium bicarbonate, and the proportions of syrup and the content of sodium bicarbonate being such as to form a paste at a temperature of 70° F., and sufficient soap to form a gel throughout the paste substantially preventing it from oozing, but insufficient to irritate the membranes of the mouth and gums or destroy the active ferments in the saliva.

ERNEST C. CROCKER.